United States Patent [19]
Dekker

[11] Patent Number: 4,884,229
[45] Date of Patent: Nov. 28, 1989

[54] METHOD AND APPARATUS FOR REMOVING NOISE

[75] Inventor: David L. Dekker, Mount Isa, Australia

[73] Assignee: Mount Isa Mines Limited, Australia

[21] Appl. No.: 265,282

[22] Filed: Oct. 26, 1988

Related U.S. Application Data

[63] Continuation of Ser. No. 748,735, Jun. 25, 1985, abandoned.

[30] Foreign Application Priority Data

Jul. 4, 1984 [AU] Australia .............................. PG5841

[51] Int. Cl.$^4$ ..................... G06F 15/31; G06F 15/336
[52] U.S. Cl. ............................ 364/724.11; 364/728.04
[58] Field of Search ....................... 364/724.08, 724.11, 364/724.13, 726, 728.03, 728.04, 819; 358/36-37; 375/96, 103; 342/189

[56] References Cited

U.S. PATENT DOCUMENTS

| | | | |
|---|---|---|---|
| 3,479,495 | 11/1969 | Malm | 364/819 |
| 3,777,133 | 12/1973 | Beck et al. | 364/728 |
| 3,986,682 | 10/1976 | Dryden | 244/3.17 |
| 4,097,801 | 6/1978 | Freeman et al. | 324/188 |
| 4,114,721 | 9/1978 | Glena, Jr. | 181/105 |
| 4,193,117 | 11/1980 | Marckwardt | 364/728 |
| 4,654,814 | 3/1987 | Sebald et al. | 364/819 |

FOREIGN PATENT DOCUMENTS

| | | | |
|---|---|---|---|
| 57-170631 | 10/1982 | Japan | 364/728 |
| 445993A | 7/1972 | U.S.S.R. | |

OTHER PUBLICATIONS

An Experimental Comparison of Optimum and Sub-Optimum Filters' Effectiveness in the Generalized Correlator by J. C. Hassab and R. E. Boucher, 1981, pp. 117-128.
Correlation-Function Peak Detector by J. R. Jordan and B. A. Manook, 1981, pp. 74-78.
Ultrasonic Transducer Systems for Flow Measurement Using Cross-Correlation by P. A. Johnston, 1973, pp. 73, 76 & 77.
Cross-Correlation Flow Measurement—A History and the State of the Art by Dr. J. Coulthard, 1983, pp. 214-218.
Digital Correlators Suit Military Applications by J. A. Eldon, 1984, pp. 148-156, 158 & 160.
Stromungsmessmethoden mit Hilfe der Korrelationsanalyse by J. Benkert, C. Mika, W. Reimche and D. Stegemann, pp. 70-83.
Signale Und System by F. H. Lange, pp. 179-182, pp. 259-262 and pp. 287-289.
Supplement to the TTL Data Book, First Edition, pp. S-312 to S-314.

Primary Examiner—Gary V. Harkcom
Assistant Examiner—Long T. Nguyen
Attorney, Agent, or Firm—Darby & Darby

[57] ABSTRACT

An apparatus and method for removing noise common to correlated real process derived signals. The method comprise the steps of determining the positive time cross correlation function, the negative time cross correlation function, and determining the difference between those functions. Apparatus for performing the method includes single bit correlator which evaluates the signals even when the input signals are resolved to more than one bit resolution. A signal processing system is employed to update smoothed estimates of the difference between functions at a rate equal to the sampling rate and to evaluate the median of the most likely time delay.

20 Claims, 11 Drawing Sheets

LAG TIME →

LAG TIME →

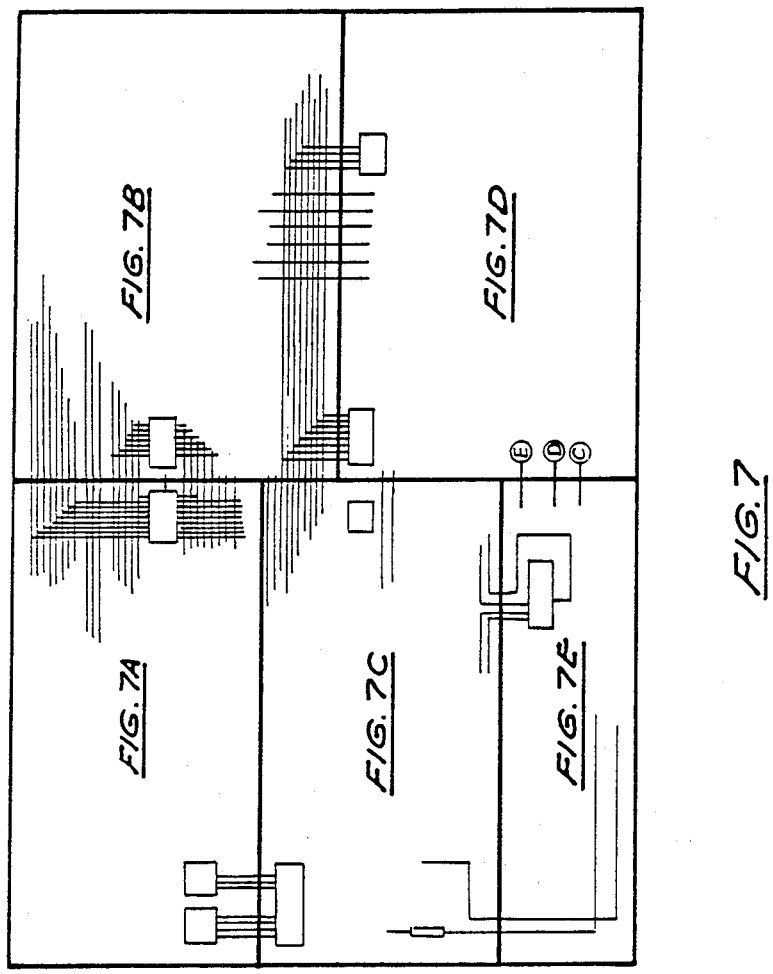

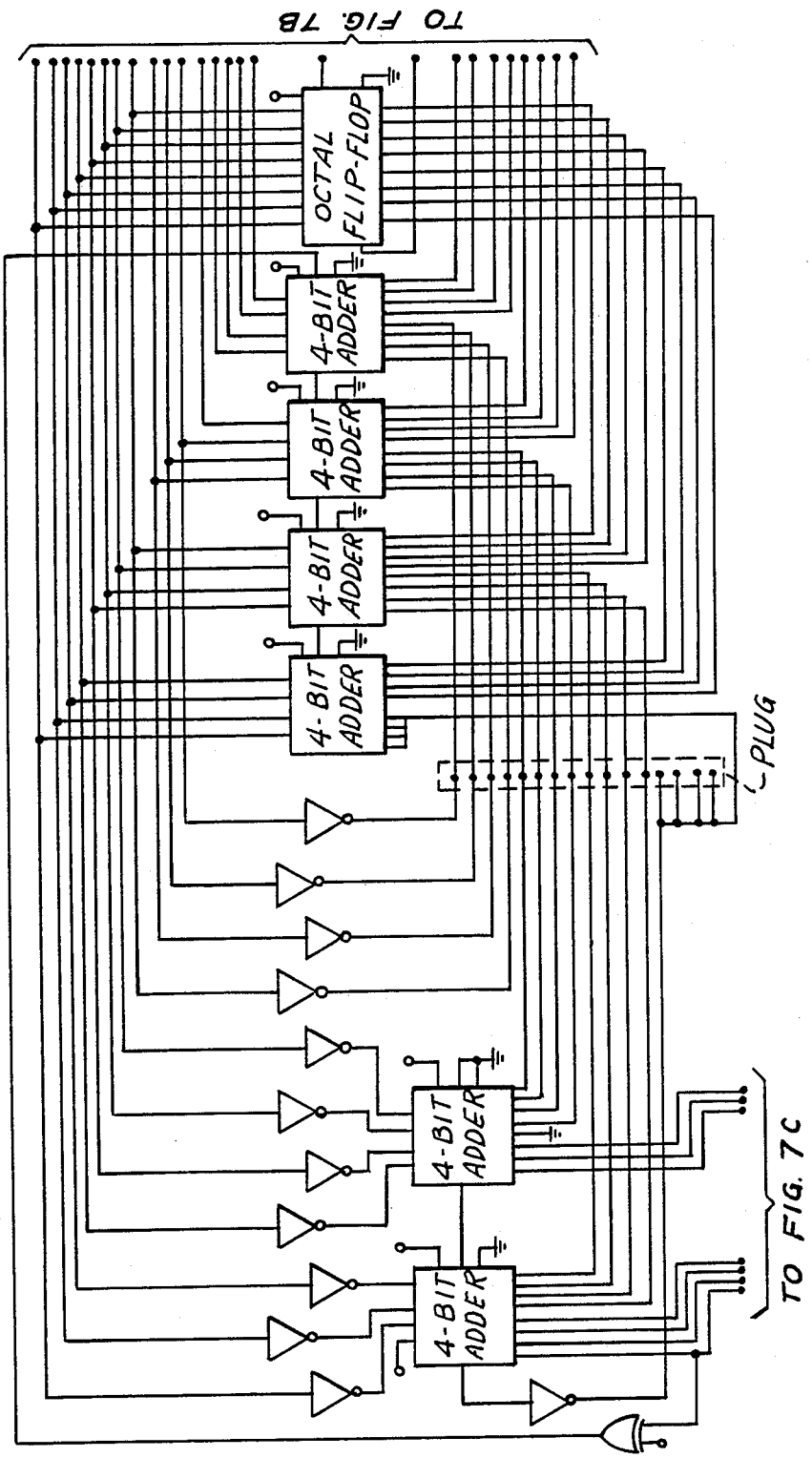

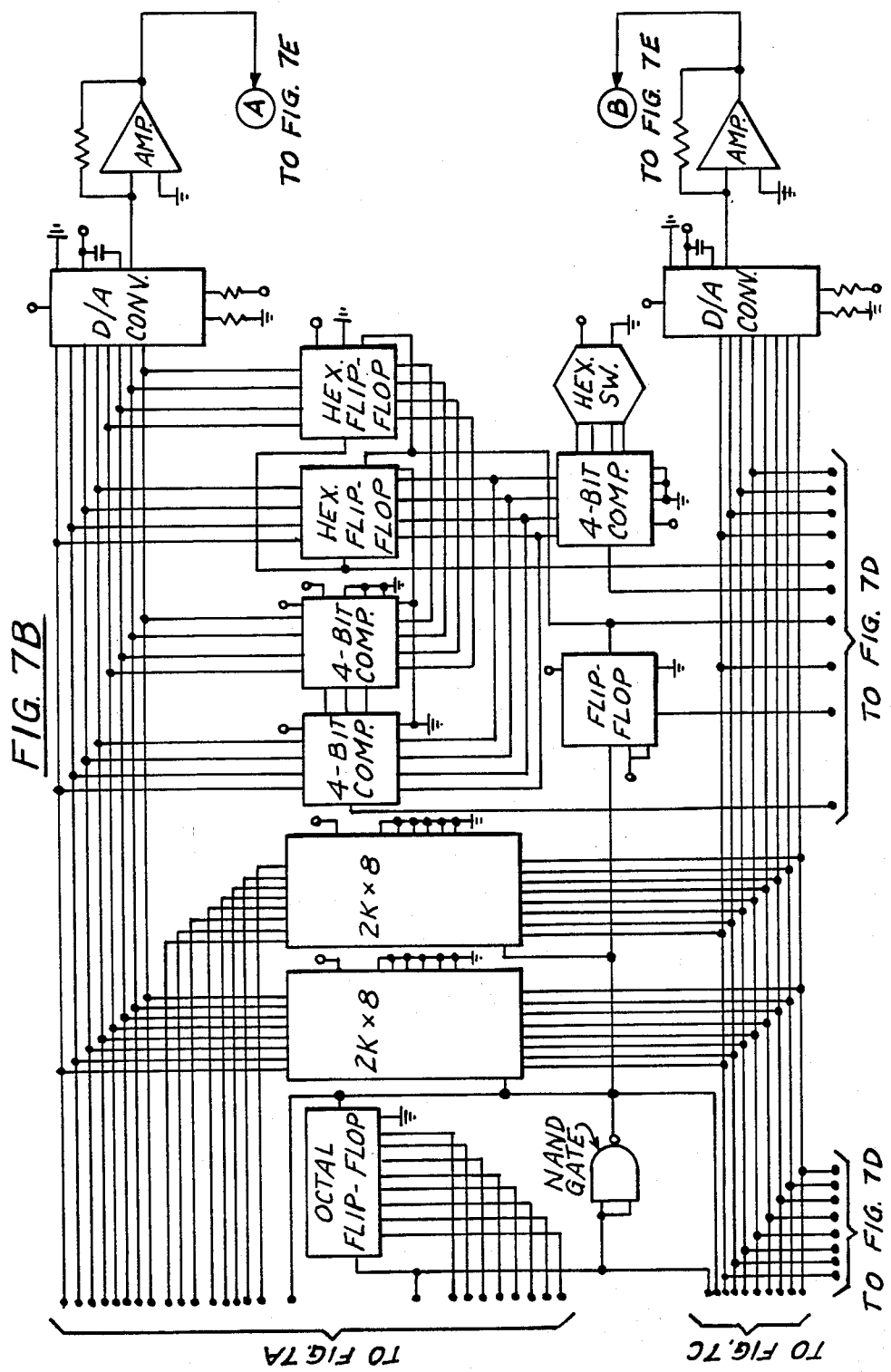

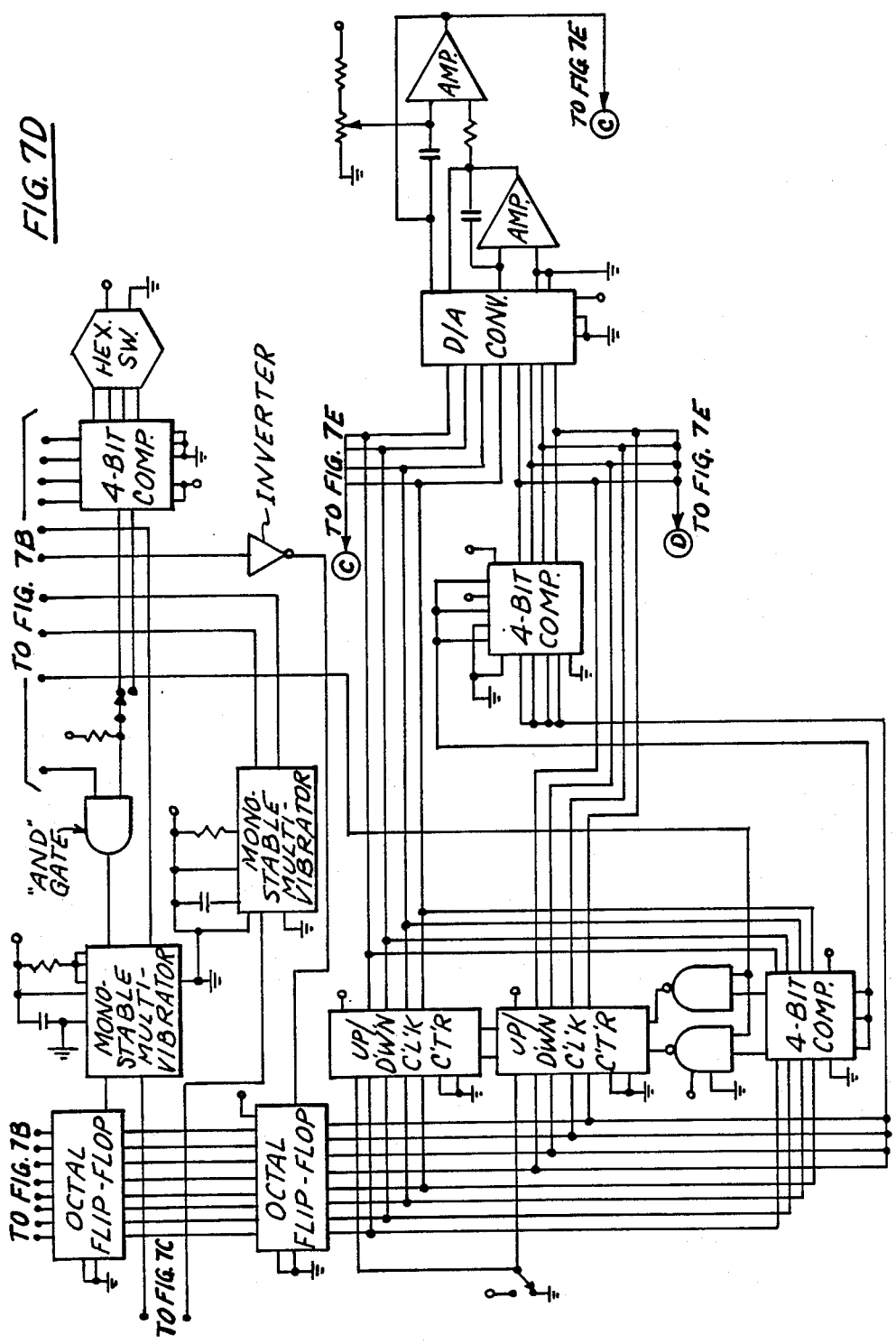

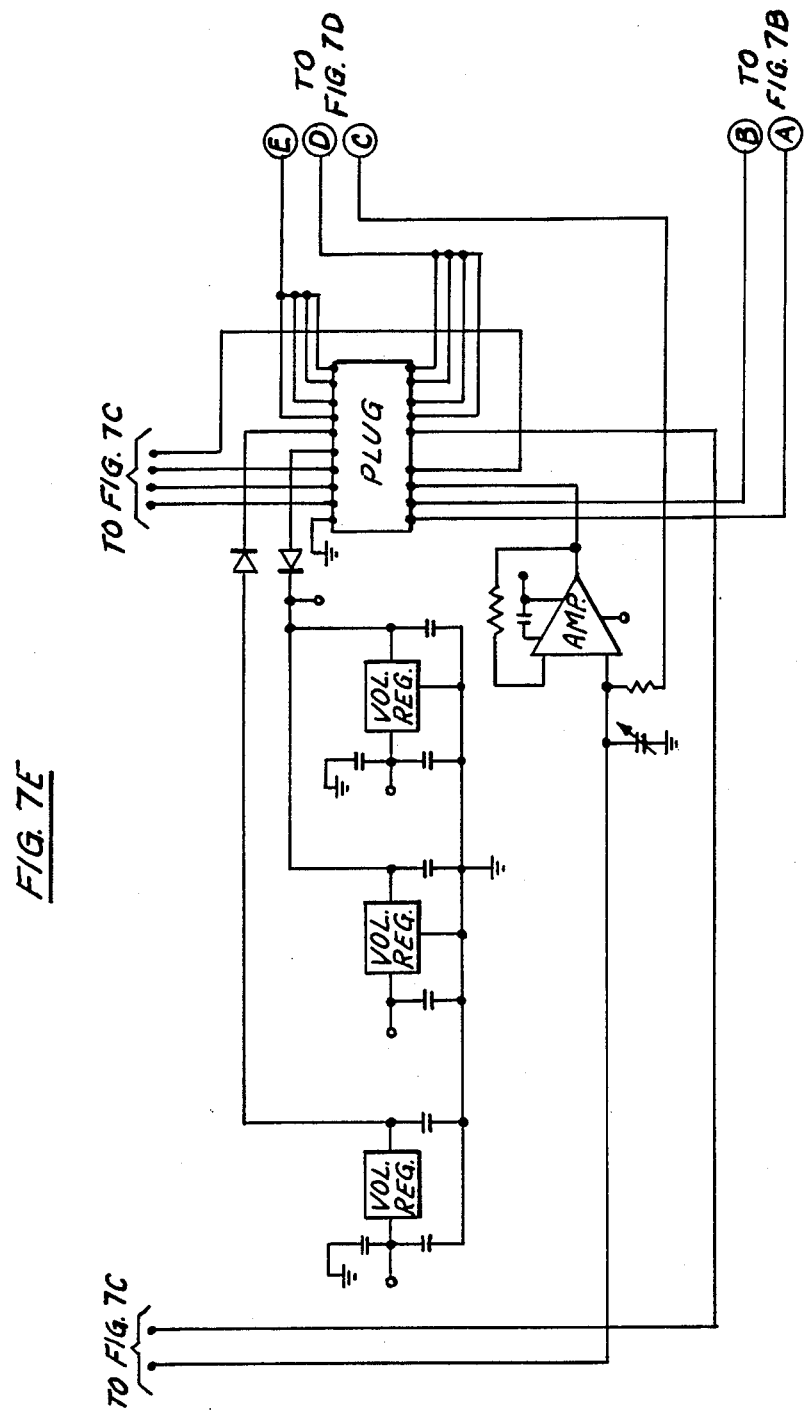

METHOD AND APPARATUS FOR REMOVING NOISE

This is a continuation of application Ser. No. 748,735 filed June 25, 1985, now abandoned.

FIELD OF THE INVENTION STATEMENT

This invention relates to a method and apparatus for correcting the cross-correlation function of two signals to remove noise common to both signals.

Apparatus for measuring the cross-correlation function between two signals is known. Such apparatus estimates the cross correlation function for positive time lags.

Such methods suffer from the disadvantage that any common node noise between the channels may bias the time lag of the correlation peak value.

When calculating the lag time for the peak value of the cross-correlation function it has been usual to sum a number, hereafter referred to as N, of previous estimates of the cross-correlation function.

That method suffers from the disadvatage that only one estimate of the lag time for the peak value is obtained for each N of estimations of the cross-correlation function.

When evaluating the cross correlation function of data sampled to more than single bit resolution it has been usual to employ a plurality of single bit correlators.

The method suffers from the disadvantage that it is costly to implement.

OBJECT OF THE INVENTION

An object of the present invention is to provide a method of and apparatus for removing noise common to two correlated signals and which avoids or at least ameliorates some of the disadvantages of the prior art.

According to one aspect the invention consists in an apparatus for removing noise common to a first signal and a second signal correlated with the first, comprising:

correlator means for providing a third signal indicative of the cross correlation of the first and second signals as a function of positive time lag of the first signal with respect to the second, and for providing a fourth signal indicative of the cross correlation of the first and second signals as a function of negative time lag of the first signal with respect to the second signal, and means for providing an output signal indicative of the difference between the third and fourth signals.

The apparatus for providing an output signal indicative of the difference between the third and fourth signals may involve analogue or digital subtraction or as is mathematically equivalent, may involve inversion of one signal and analogue or digital addition.

Preferred embodiments of the invention provide apparatus whereby both positive and negative time lags of the cross-correlation function are differenced to remove the autocorrelation function of noise common to both signals and individual estimates of the cross-correlation function at each discrete lag time are exponentially smoothed. Desirably embodiments include apparatus whereby the median value of the lag time for the peak value of the correlation function is evaluated.

Desirably embodiments include apparatus whereby the cross correlation of two signals which have been digitised to more than 1 bit resolution is evaluated by one single bit correlator.

BRIEF DESCRIPTION OF THE DRAWINGS

The invention will now be described by way of example only with reference to the accompanying drawings, wherein:

FIG. 7a, 7b, 7c, 7d and 7e show a complete circuit diagram of apparatus according to the invention.

DESCRIPTION OF THE PREFERRED EMBODIMENT(s)

The cross correlation function Ryx(T) of two signals y(t) and x(t) is given by $$Ryx(T) = \frac{1}{M} \int_0^M y(t)x(t-T)$$

dt, wherein T is lag time, M is the total sampling time.

If y(t) is the output of a linear system with input x(t) and impulse response h(T), then The convolution relation:

$$Ryx(T) = \int_0^\infty h(T-t) Rxx(t) dt$$

also holds.

Figure 1:
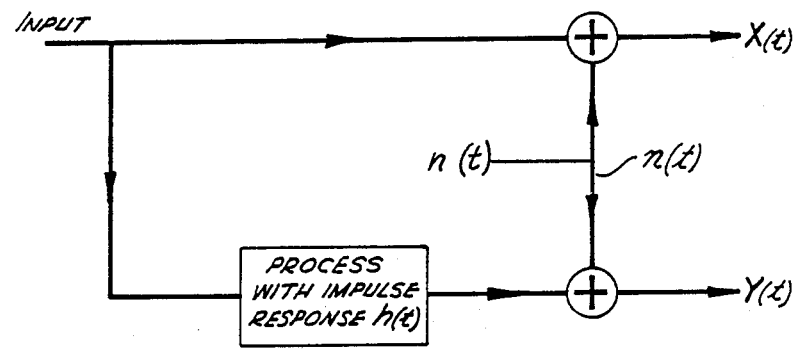
FIG. 1 is a diagram illustrating the presence of common mode noise in correlated real process signals.

In a real proces common node noise n(t) may be present, as shown in FIG. 1.

When the process is a pure transport lag (L), h(T) becomes a unit impulse at time delay L, and Ryx (T)=Rxx (T-L)+Rnn (T).

Since all autocorrelation functions, for example:

Rnn (T), are symetrical about zero T, that is:

Rnn (T)=Rnn (-T), then

Ryx (T)-Ryx (-T)=Rxx (T-L)-Rxx (-T-L).

In order to determine L accurately, the signals x(t) and y(t) must have a bandwidth sufficient to ensure that h(T) is a narrow peak at lag time L, and thus that Rxx (T) is very small for |T|>L, and thus:

Ryx (T)-Ryx (-T)=Rxx (T-L) which is the cross-correlation function free from noise n(t).

Figure 2:
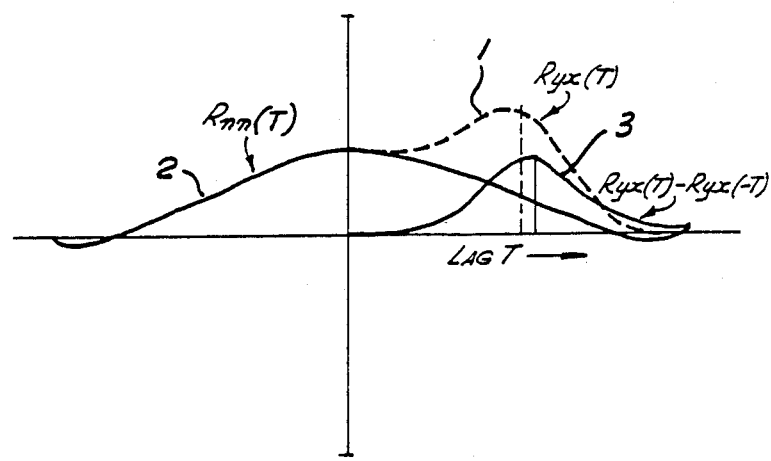
FIG. 2 is a diagram showing a typical uncorrected cross-correlation function, and a function corrected for common mode noise.

FIG. 2 shows a sketch of a typical cross-correlation function between two process signals which are similar in spectral content, but with one signal (y(t)), referred to as the downstream signal, delayed in time with respect to the other (x(t)). The signals are shown as a function of Lag T. Curve 1 shows the uncorrected cross-correlation function Ryx (T). Curve 2 shows the common mode noise (auto correlation function) Rnn (T). Curve 3 shows the function corrected for common mode noise. As is evident from FIG. 2, the peak value of a cross-correlation function may be biased in both time (Lag) and amplitude by common mode noise.

Any noise which is common to both channels can be removed from the cross correlation function by subtracting the correlation value at negative time lags from that at respective positive time lags.

Figure 3A:
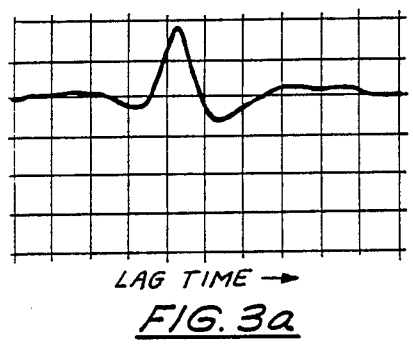
FIGS. 3a, 3b and 3c exemplify a positive time lag cross-correlation function signal for process signals.
Figure 3B:
Figure 3C:
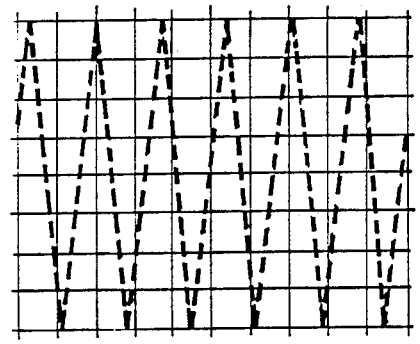

FIG. 3 shows positive time lag cross-correlation functions for measured process signals with varying amounts of 120 Hz sine wave noise added to both channels. The top diagram 3(a) shows results for a noise free signal. The second 3(b) for a signal to noise ratio of 4:1 and the third 3(c) for the noise only. FIG. 3(c) shows uncorrected cross-correlation function for a measured process with 120 Hz noise added, 7.8 mS per division horizontal and demonstrates perfect correlation at top of screen and perfect negative correlation at bottom of screen. The bias in peak position between FIGS. 3(a) and 3(b) is evident.

Figure 4A:
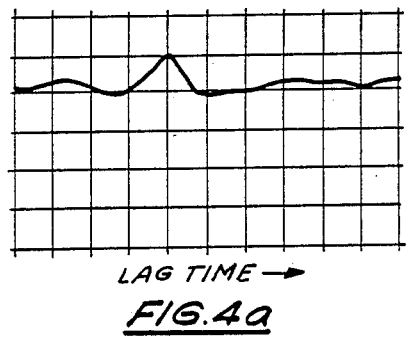
FIGS. 4a, 4b and 4c show the cross-correlation function signal of FIG. 3 corrected for common mode noise by the method of the invention.
Figure 4B:
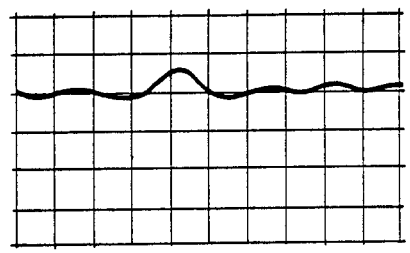
Figure 4C:
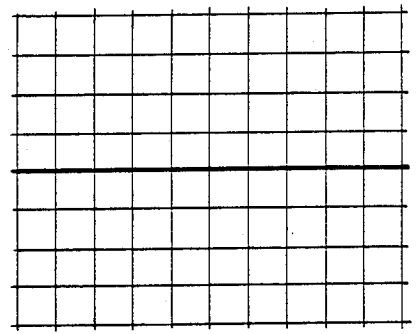

FIG. 4 shows the output from the improved cross-correlator circuit according to the invention. The cross-correlation function is corrected for common mode noise and under the same conditions as in FIG. 3. It can be seen that the lag time of the peak correlation value is now biased by the noise, and that the noise is no longer apparent.

In preferred embodiments of the invention, Ryx(T)-Ryx(-T) is evaluated by time multiplexing the serial inputs to the correlator, such that every second sample of both inputs represents -Ryx(-T) and very other sample of both inputs represents Ryx(T).

In preferred embodiments of the invention the difference, Ryx(T)-Ryx(-(T), at each time lag (T) is exponentially smoothed by means of circuits which perform the steps of:

(1) storing an exponentially smooth value of each difference;

(2) calculating a function of lag time herein defined as A by dividing each stored value by a power of two;

(3) calculating a function of lag time herein defined as B by dividing each new difference value by the same power of two;

(4) calculating a function of lag time herein defined as C by evaluating the "two's complement" of each value in A;

(5) calculating the sum of B and C;

(6) calculating a correction function herein defined as the sum of B and C divided by a further adjustable power of two, resulting in an adjustable time constant for the expoentially smoothed values;

(7) adding said correction function to the stored values resulting in said stored values being updated.

Desirably embodiments the exponentially smoothed stored values, being a function of positive lag number, provide an output proportional to the median of the lag time of the largest value of the stored function by:

(1) circuits which determine the lag time, herein designated by L, of the largest value of the stored function;

(2) incrementing said output if the value of L is greater than said output;

(3) decrementing said output if the value of L is smaller than said output.

According to preferred embodiments of the invention, the two input signals are zero crossing polarity detected (given a value of 0 or 1 depending on whether they are less than or greater than zero respectively). Signals with more than 1 bit resolution are accommodated by an optional add on circuit, the preferred embodiment of which is detailed in FIG. 5. The preferred embodiment achieves 2 bit resolution by time multiplexing three input signal configurations on one single bit correlator. The three input configurations are:

(a) Correlation of the most significant bit of the upstream signal with the most significant bit of the downstream signal.

(b) Correlation of the most significant bit of the upstream signal with the least significant bit of the downstream signal.

(c) Correlation of the least significant bit of the upstream signal with the most significant bit of the downstream signal.

The simultaneous correlation of these multiplexed input configurations is equivalent to adding results from three separate single bit correlators. This is known to provide correct statistical weighting to the significance of the bits as described. As used herein, downstream refers to the signal in which the required information is delayed in time with respect to the same information in the other signal herein referred to as the "Upstream" signal.

For preference a single digital cross-correlation integrated circuit is employed which samples the inputs twice in rapid succession (compared to the sample rate), firstly connected normally and secondly connected with reversed inputs and with one input inverted, that is to say, the input normally connected to the upstream signal is connected to the downstream signal and the input normally connected to the downstream signal is connected to the inverted upstream signal. In a less preferred embodiment two digital cross-correlator integrated circuits are employed. The second of the digital cross-correlator integrated circuits is connected with reversed inputs, that is to say, the input designed to be connected to the Upstream signal is connected to the Downstream signal and the input designed to be connected to the Downstream signal is inverted and connected to the Upstream signal. In this embodiment the output from the digital cross correlators is added to the output of the second. It will be understood that this is mathematically equivalent to feeding the first and non-inverted second signals to respective second and first terminals of the second digital correlator and differencing the outputs.

The invention will now be described, by way of example only, with reference to FIGS. 5, 6 and 7. Components referred to in the figures are identified by numbers, and data by a function of time, (e.g., A(t)) or a letter). Data flow is indicated by arrows. The number of physical wires in a data bus is indicated by a slash and a number.

Figure 5:
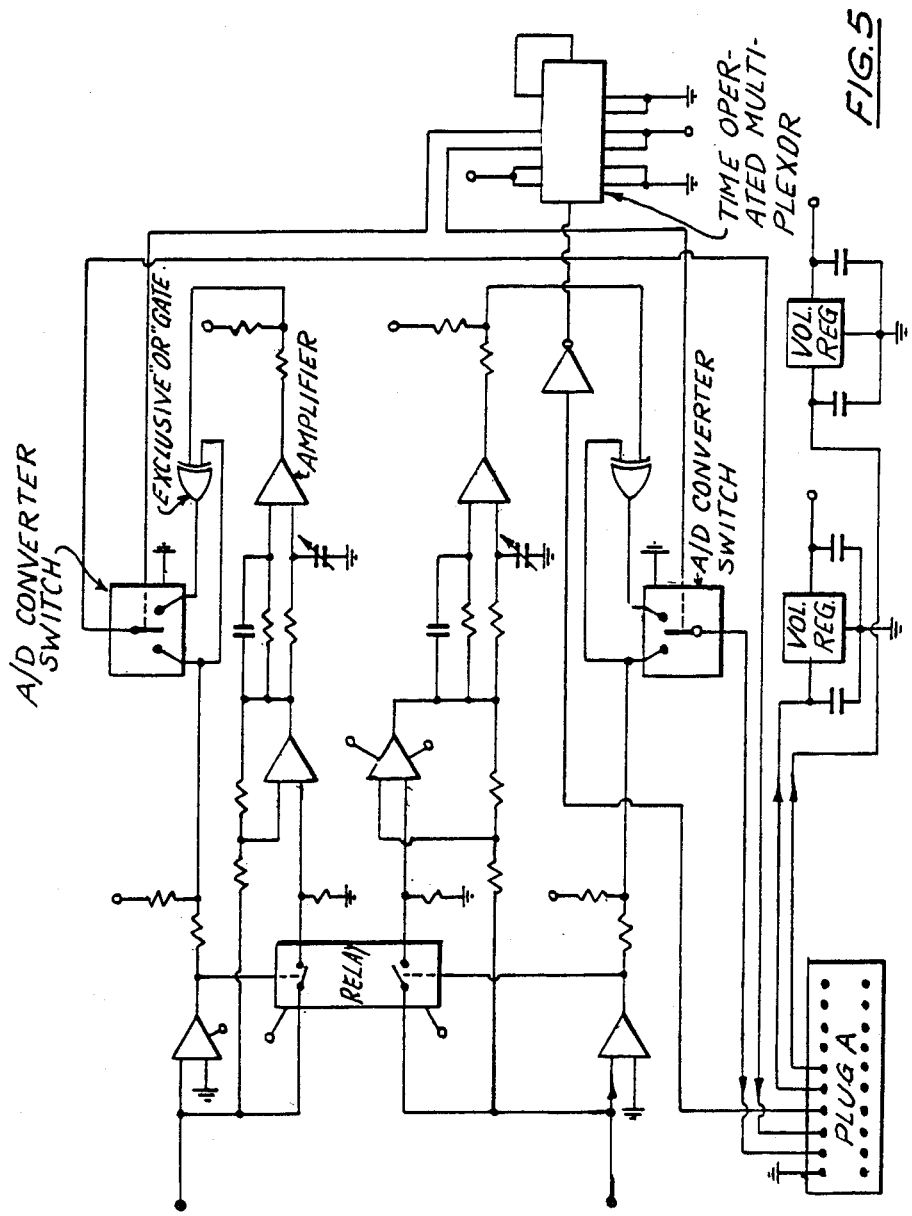
FIG. 5 shows a preferred embodiment of a cross-correlator preprocessor circuit.

FIG. 5 shows a preprocessor for the cross-correlator which comprises two 2 bit analog to digital converters and a time operated multiplexer which enables correct weighting to be applied to each bit of the digitised data on a time shared basis. This circuitry constitutes an optional "plug-in" in addition to the common mode corrected correlator circuit of FIG. 6a.

The analog to digital converters k are designed to automatically adjust the full scale range according to the input signal amplitude.

Figure 6A:
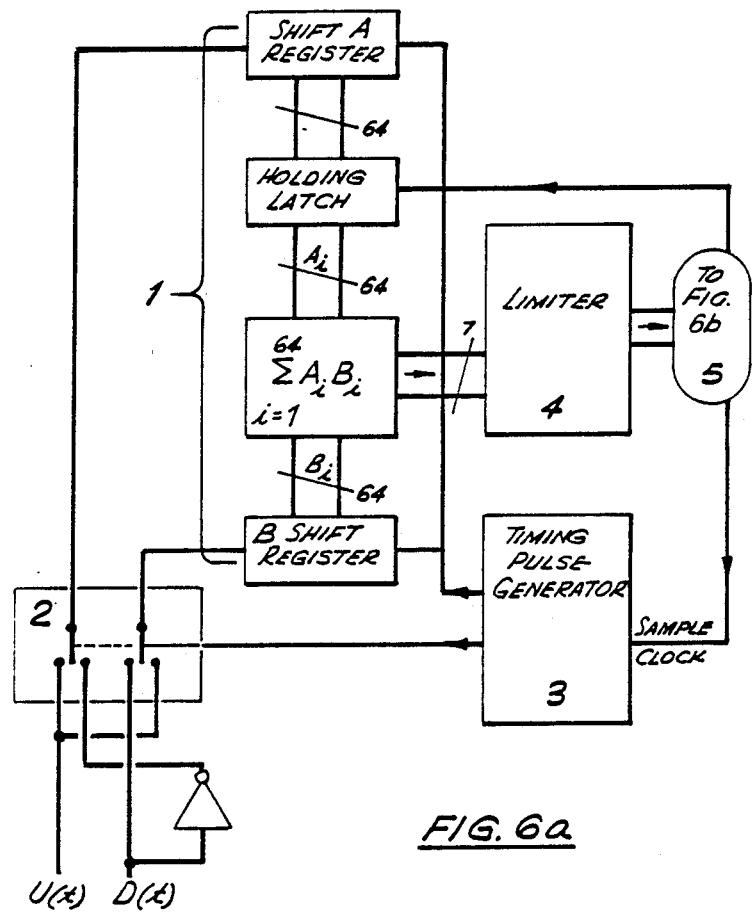
FIG. 6a and 6b show a schematic diagram of a circuit according to the invention.

FIG. 6a shows a common mode corrected correlator that provides a number between 0 and 64 which represents the correlation level between the two inputs at each sample interval.

This implementation samples the two inputs U(t) and D(t) by zero crossing polarity detection. The noise corrected cross correlation is implemented in part by a TRW 1023J correlator integrated circuit. At the completion of each record (period of 256 samples), the last 64 binary samples, obtained from the last 32 upstream samples alternated with the last 32 inverted downstream samples are loaded into a holding latch, as described in FIG. 6a (1 and 2). At each of the next 256 camples the TRW 1023J evaluates a 7-bit correlation between the holding latch and the latest contents of the B shift register.

For preference, the correlator output, which ranges from 0 to 64 is limited to 0 to 63 to prevent overflow in the following circuitry (4).

The result is a correlation which has been corrected for common mode noise. This common mode noise correction technique is implemented with the circuitry in FIG. 7. It is constructed in such a way that it is pin for pin compatible with a single TRW 1023J correlator integrated circuit via a plug (5), thus allowing existing cross-correlator designs to be upgraded by a plug in replacement.

Figure 6B:
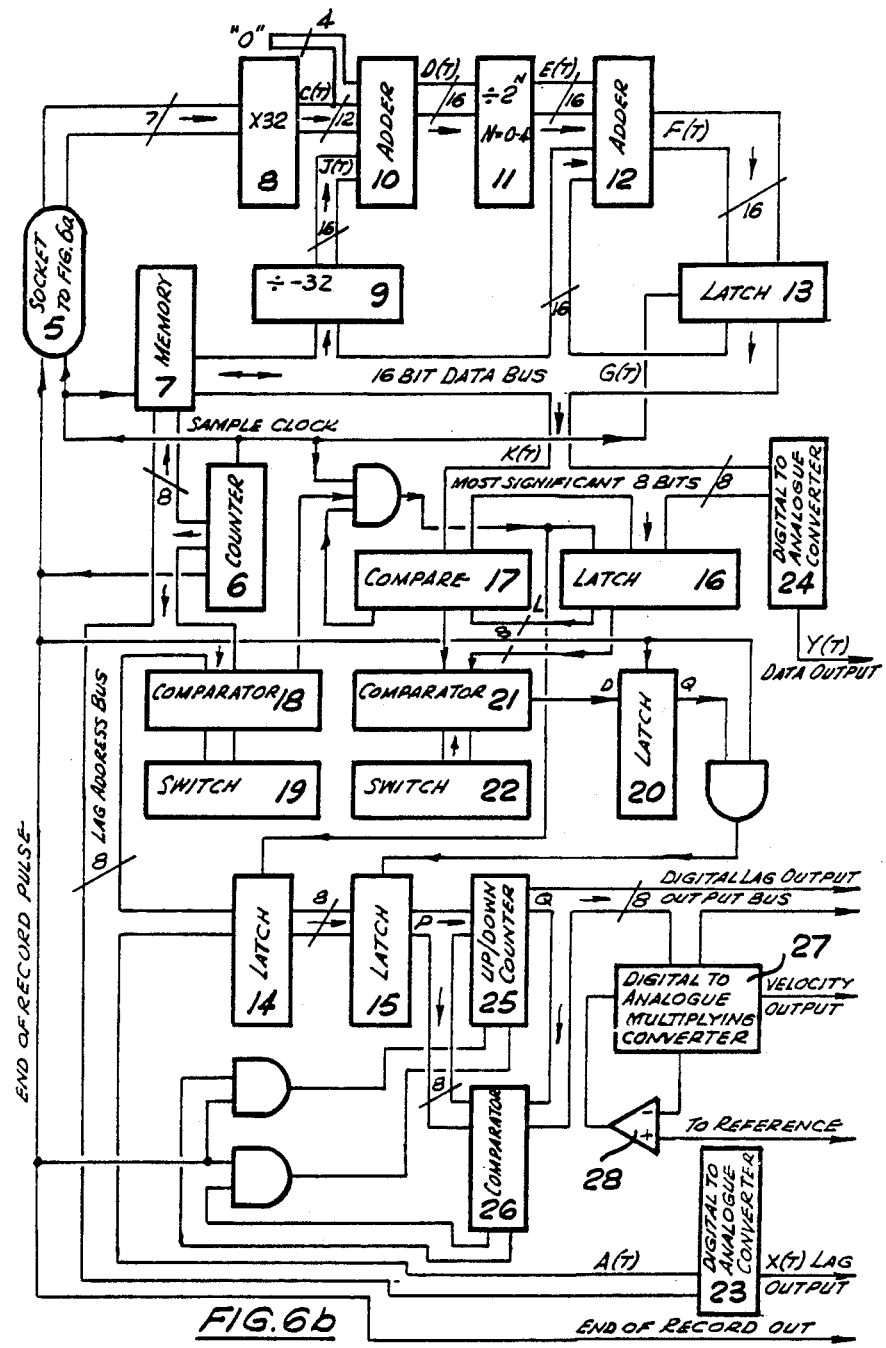

The clock in FIG. 6b (6) provides:
1. A sample interval clock which is adjustable.
2. A lag number which is incremented by one after each sample interval.
3. A pulse after the 256th sample sample interval (when the lag number is reset to zero). This pulse is also used to control the multibit time multiplexer (FIG. 5).

In FIG. 6b the exponential soothing circuit provides:
1. A means for calculating the exponentially smoothed value of the corrected cross correlation function at each lag number.
12. Random Access Memory (7) to store the 256 smoothed corrected correlation values. The 7-bit corrected correlation is multiplied by 32 to give a 12-bit number (C(T) in FIG. 6b (8)). C(T) is limited to 2047 for perfect correlation, and 0 for perfect negative correlation. A(T) is the value of the address bus and is known as the lag number. When the input signals are derived from random processes, the precision at a given lag number can be improved by smoothing. Each of the 256 values are exponentially smoothed, with 256 smoothed values being stored in Random Access Memory (7).

If G(T) in FIG. 6 is the smoother, noise corrected correlation function and C(T,N) is the value of C(T) obtained N records previously, then:

$$G(T) = \sum_{N=1}^{\infty} C(T,N)(1 - 1/k)^N \quad (1)$$

k is the smoothing time in recores, and k is a power of 2.

The smoothed corrected correlation value for lag T is updated in the following manner. J (T) is calculated from:

$$J(T) = -G(T)/32 \quad (9). \quad (2)$$

using 2's complement arithmetic. D(T) is then calculated by:

$$D(T) = C(T)/32 + J(T) = C(T)/32 - G(T)/32 \quad (3)$$

D(T) represents a negative nubmer if its most significant bit is set, that is to say, it is in 2's complement form.

If, for example, k=64, then D(T) is divided by two (11), and E(T) becomes:

$$E(T) = C(T)/64 - G(T)/64 \quad (4)$$

E(T) representes the adjustment which must be added to G(T) to update G(T). E(T) is in two's complement form. G(T) is always a positive number, and is in absolute binary form.

The adjustment E(T) is added to G(T) in (12 and 13) to give the updtated value:

$$G(T) \text{ updated} = (C(T)/64) + (1-1/64) G(T) \quad (5)$$

This recursive formula can be read as an exponentially smoothed version of C(T).

In FIG. 6b the peak detector circuit provides:
1. The lag number (address) of the largest smoothed corrected correlation value found during the current record of 256 samples. This is held in latch 14. The output is latched (15) at the end of a record.

At the beginning of a record latch (16), and thus L is cleared. The value of K(T) is compared with L (17). If K(T)>L, and if T is greater than a present minimum determined by (18) and (19) then after the next sample check, clock L becomes K(T) and the value of T is latched into (14). At the end of the record L contains the largest corrected correlation value and (14) contains the lag number of the largest corrected correlation value.

2. A means of ensuring that if the peak corrected correlation value is too low then the output is not updated (20 through 22).

Both the lag number A(T) and the corrected correlation values K(T) are available as analogue outputs which can be used to display the "correlogram" on an oscilloscope (23 and 24).

In FIG. 6b, latch (15) contains the lag number of the peak corrected correlation value. The median value of the contents of (15) over several records is obtained in preference to simple averaging since the median is more immune to noise.

The principle of the median lag follower is as follows:
If Q is the output of the follower and P is the input, then at the end of each record Q (output of counter(25)) is incremented by one if P>Q or decremented by one if P<Q (as determined by (26)).

A more detailed description of the preferred embodiment of the invention is given below, in which:

Two rapid clock pulses shift two values into each of the upstream and downstream registers of the TDC1023J circuit (FIG. 6a). These clock pules are generated in (3) and at the first clock pulse the switch (2) is set to the left and at the second clock pulse the switch (2) is set to the right.

The 7-bit correlation result is shifted by five bits to provide a 12-bit number (C(T) in FIG 6). This is added to a 16-bit number (J(T) in FIG. 6) derived from the data bus. The data bus is divided by 32 by shifting by five bits. The most significant five bits are implied zeros. The two's complement is shaken by inverting all sixteen bits and adding one. Thus the most significant five bits of J(T) are thus all ones. The least significant five bits of C(T) are all zeros. C(T) and J(T) are now added.

Since all bits representing 2 to the power (12 to 15) in J(T) are ones and all similar valued bits of C(T) are zeros, the adder for the most significant four bits consists of a single inverter derived from the carry output of IC 3.

This two's complement number may then be divided by 1,2,4,8 or 16, depending upon the required exponential smoothing time. (Representing 32,64,128,256 or 512 times the maximum correlation time.) The adder outputs are stored in a 16-bit latch.

The latch outputs are stored in memory at the address given by the lag nubmer. The memory consists of two 2K×8 CMOS static RAM chips (5) arranged as a 16-bit wide memory. Only 256 memory addresses are used.

Two D/A converters, FIG. 6b (23 and 24) provide analogue outputs of the data bus and lag number bus respectively. These enable the latest "correlogram" to be displayed on an Oscilloscope in real time.

At the beginning of a record, the peak comparator latch (16) is cleared. At each sample clock the eight most significant bits of the data bus are latched if they represent a number larger than that currently contained in the latch. This latch therefore holds the largest corrected correlation value for the current record.

The lag number is latched (14) at a transition of the sample clock provided the peak comparator (17) indicates that this is the largest smooth corrected correlation value to date for this record and provided the lag number is greater than the minimum set on switch (19).

The downward transition of the most significant bit of the lag number A(t) signals the end of a record (256 samples).

The latch (14) contains the lag nubmer of the peak corrected correlation so far for this record. At the end of a record, this number is latched into the end of record latch (15). Said latch holds the lag number of the corrected correlation peak and is updated after each record is complete, provided the amplitude of the corrected correlation peak is greater than a minimum set by switch (22).

At the end of a record the up/down counter (25) with optional parallel load is incremented by one, decremented by one or left as is, if the output of the end of record is greater than, less than or equal to the up/down counter output (as determined by (26)) respectively. This constitutes the median lag calculation.

The digital output (Q) is the lag number of the peak corrected cross correlation, that is to say, an estimate of the time lag between the two input signals. This implementation of the invention also provides for a multiplying digital to analogue converter (27), connected such that:

i. the digital value representing the lag time of the peak of the corrected cross correlation function is connected to the digital input of the multiplying digital to analogue converter (27):

ii, the output of the multiplying digital to analogue converter is subtracted from a one-volt reference and the result of this subtraction then amplified (28). Said amplified signal is applied to the voltage reference input of the multiplying digital to analog converter: iii, the output is taken from the reference voltage applied to the multiplying digital to analogue converter. When the invention is applied in an application where the input signals represent properties of a flowing material as measured by two sensors separated by a known distance, then said output is then proportional to the velocity of the material.

Figure 7C:
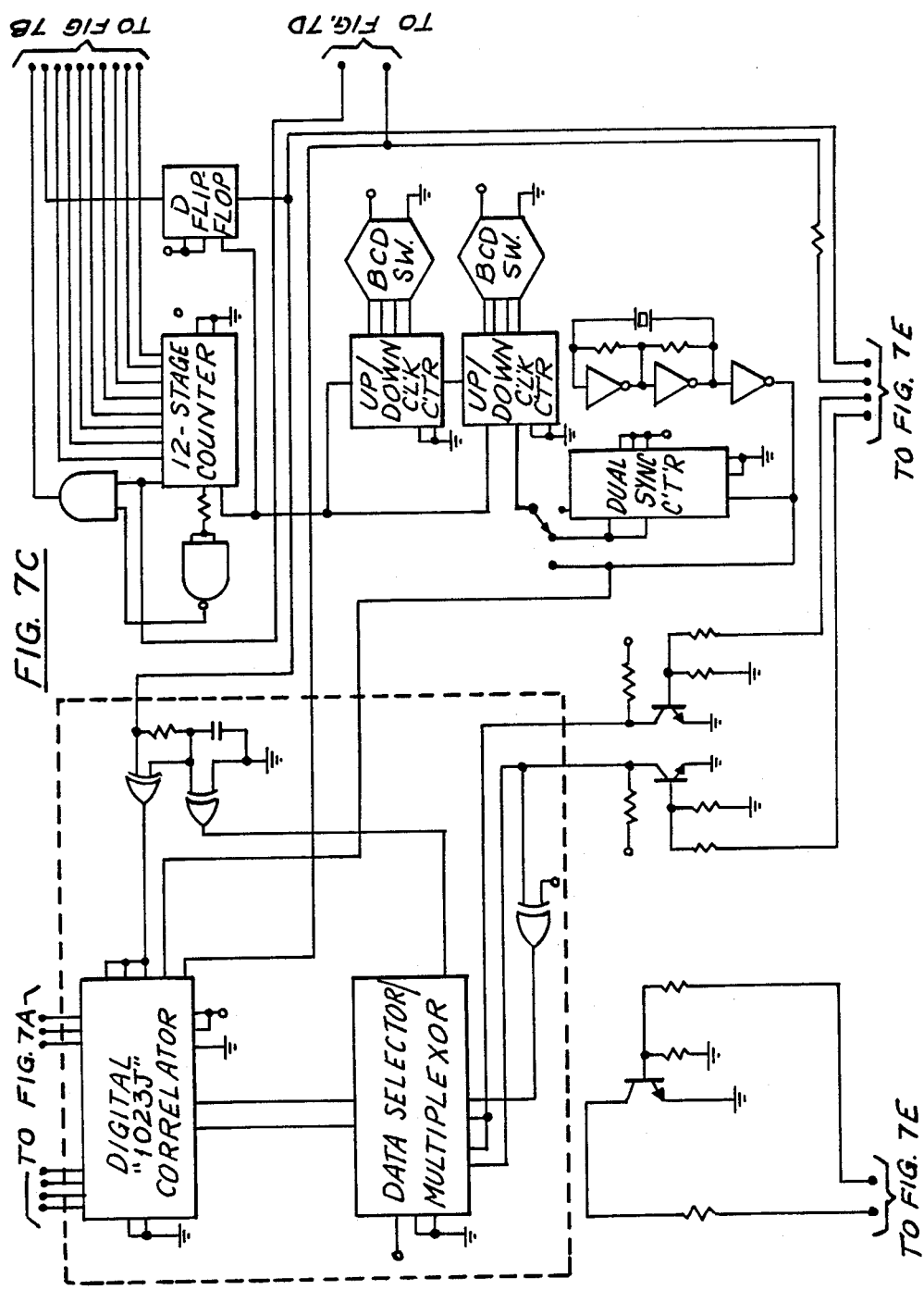

A complete circuit diagram is enclosed as FIG. 7.

It will be understood that Ryx(T)-Ryx(-T) is mathematically equivalent to the inverse fourier transform of the imaginary part of the complex cross-power spectrum of Y(T) and X(T).

This method for deriving the required function could be implemented by a microprocessor, however current state of the art makes this impractical (high cost and slow operation).

As will be apparent to those skilled in the art from the teaching thereof the invention herein described may be implemented by other circuits and all such equivalent embodiments are deemed to be within the scope thereof.

I claim:

1. Apparatus for removing noise common to a first signal and a second signal correlated with the first signal, said apparatus comprising:
   correlator means for providing an output signal indicative of the difference between the cross correlation of the first and second signals as a function of positive time lag of the first signal with respect to the second signal, and the cross correlation of the first and second signals as a function of negative time lag of the first signal with respect to the second signal, said correlator means comprising a signal correlator having a first circuit input, a second circuit input, and providing a signal which is indicative of the cross correlation of signals applied to the circuit inputs as a function of time lag of one input signal with respect to the other, and means for switching inputs between a positive time lag mode and a negative time lag mode, said switching means in the positive time lag mode directing the first signal to the first circuit input and the second signal to the second circuit input and said switching means in the negative time lag mode directing the first signal to the second circuit input, and the second signal to the first circuit input, wherein the correlator means includes means for inverting one of the input signals applied in one of the modes.

2. Apparatus according to claim 1 further comprising means for storing the difference between the output signal obtained when the switch means is in a positive time lag mode and the output signal obtained when the switch is in a negative time lag mode.

3. Apparatus according to claim 1, wherein the correlator is a single bit correlator circuit and further comprising means for time multiplexing the input signals.

4. Apparatus according to claim 1, wherein every second sample of output represents the cross correlation of the first signal with respect to the second signal for a negative time lag and every alternate output represents said cross correlation for a positive time lag.

5. Apparatus according to claim 1 further comprising a memory means for storing signals representing exponentially smoothed estimates of the output signal from the correlater means at various values of time lag, and means for updating the memory means at a rate equal to a sampling rate of the first and second input signals.

6. Apparatus according to claim 1 further comprising data processing means for evaluating a median value of the time lag corresponding to a maximum positive value of a corrected cross correlation function.

7. Apparatus according to claim 1 further comprising means to digitise the first signal and the second signal each to two bit resolution and means to time multiplex selected combinations of the resulting four bits to evaluate the corrected cross correlation functions of inputs with two bit resolution.

8. Apparatus for removing noise common to a first signal and a second signal correlated with the first signal, said apparatus comprising: correlator means for providing an output signal indicative first and second signals as a function of positive time lag of the first signal with respect to the second signal, and the cross correlation of the first and second signals as a function of negative time lag of the first signal with respect to the second signal, said correlator means comprising a first digital cross correlator, a second digital cross correlator, means to supply the first and second signals to respective first and second inputs of the first cross correlator and to supply the first and second signals to respective second and first inputs of the second cross correlator, and means for indicating the difference between the outputs of the first and second digital cross correlators, and wherein one of the signals to one of the correlators is inverted and the output signals of said cross correlators is summed to indicate said difference.

9. Apparatus according to claim 8, wherein each correlator is a single bit correlator circuit.

10. Apparatus according to claim 8, further comprising memory means for storing signals representing exponentially smoothed estimates of the output signal from the correlator means at various values of time lag, and means for updating the memory means at a rate equal to a sampling rate of the first and second input signals.

11. Apparatus according to claim 8 further comprising data processing means for evaluating a median value of the time lag corresponding to maximum positive value of a corrected cross correlation function.

12. Apparatus according to claim 8 further comprising means to digitise the first signal and the second signal each to two bit resolution thereby providing four bits and means to time multiplex selected combinations of the four bits to evaluate the corrected cross correlation functions of inputs with two bit resolution.

13. A method for removing noise common to a first signal and a second signal correlated with the first signal comprising the steps of processing the first signal and the second signal so as to provide an output signal indicative of the difference between the cross correlation of the first signal and the second signal as function of positive time lag of the first signal with respect to the second signal and the cross correlation of the first and second signals as a function of negative time lag of the first signal with respect to the second signal, said processing step including the steps of: switching the first and second signals between a positive time lag mode in which the first and second signals are fed to respective first and second circuit inputs of a signal correlator, and a negative time lag mode in which the first and inverted second signal are fed to respective second and first circuit inputs of the cross correlator.

14. A method according to claim 13 further comprising the step of storing the difference between the output signal obtained when the signals are switched in the positive time lag and the output signal obtained when the signals are switched in the negative time lag mode.

15. A method according to claim 13, wherein the signal correlator is a single bit correlator circuit and further comprising the step of time multiplexing the input signals.

16. A method according to claim 13 further comprising the step of storing signals representing exponentially smoothed estimates of the output signal at various values of time lag, and updating the estimates at a rate equal to a sampling rate of the first and second input signals.

17. A method for removing noise common to a first signal and a second signal correlated with the first signal, comprising the steps of: processing the first and second signals so as to provide an output signal indicative of the difference between the cross correlation of the first and second signals as a function of positive time lag of the first signal with respect to the second signal and the cross correlation of the first and second signals as a function of negative timelag of the first signal with respect to the second signal, said processing step including the steps of feeding the first and second signals to respective first and second terminals of a first digital cross correlator, feeding the first and inverted second signals to respective second and first terminals of a second digital cross correlator and adding the output signals obtained from said cross correlators.

18. A method according to claim 17, wherein each correlator is a single bit correlator.

19. A method according to claim 18 comprising the step of storing signals representing exponentially smoothed estimates of the output signal at various values of time lag.

20. A method according to claim 18, wherein the estimates are updated at a rate substantially equal to the sampling rate of the first and second signals.

* * * * *